United States Patent Office 3,359,284
Patented Dec. 19, 1967

3,359,284
PROCESS FOR PREPARING TETRAPHENYLFURAN
Saul Patai, Yuval Halpern, and Michael Michman, Jerusalem, Israel, assignors to Yissum Research Development Company, a company of Israel
No Drawing. Filed Mar. 29, 1966, Ser. No. 538,192
Claims priority, application Israel, Mar. 18, 1966, 25,417
4 Claims. (Cl. 260—346.1)

The present invention relates to a process for preparing tetraphenylfuran and, more particularly, to a method of preparing tetraphenylfuran utilizing benzoin as a starting material.

Tetraphenylfuran, useful as a scintillator and as an additive to cellulose, is prepared synthetically in the prior art by a member of various methods. However, these methods suffer from a variety of defects. Thus, certain of the prior art methods requires the use of expensive solvents which increases the overall cost of producing the tetraphenylfuran. Other methods have suffered from the defect of providing the product in low yields. Still other methods require large volumes of reactants and/or long reaction periods. Still other methods produce by-products for which there is no use.

It is an object of the present invention to provide a new and improved method of forming tetraphenylfuran.

It is another object of the present invention to form tetraphenylfuran in the absence of solvents.

It is another object of the present invention to provide tetraphenylfuran utilizing short reaction periods.

It is another object of the present invention to provide tetraphenylfuran in a simple, quick procedure which provides the product in high yield.

It is another object of the present invention to provide tetraphenylfuran according to a process providing as a by-product a material which can be reconverted to the starting material.

It is another object of the present invention to provide a simple and inexpensive process for producing tetraphenylfuran which obviates disadvantages of the prior art methods, such as indicated above.

These and other objects and the nature and advantages of the present invention will be more clear from the following detailed description.

It has now been found in accordance with the present invention that benzoin may be simply and inexpensively converted to tetraphenylfuran in relatively high yields by merely heating the benzoin to a temperature within the range of 150°–200° C. in the presence of a proton donating catalyst such as aluminum chloride, a Lewis acid, or another acid. The resultant tetraphenylfuran finds use as a scintillator or a cellulose additive and tetraphenylfuran is also a useful chemical intermediate.

Thermal disproportionation of a benzoin to desoxy-benzoin and benzil occurs on heating the benzoin to 230°–300° C. in the absence of a catalyst (note Lachman, Journal of American Chemical Society, 1924, vol. 46, page 717). This has been shown even on attempted gas/liquid chromatography (Banbury et al., Journal Chromatography, 1964, vol. 14, page 98.) Benzoin has also been reacted in the presence of acids (e.g. Berger et al., Journal of Organic Chemistry, 1959 vol. 24, p. 1881) and aluminum powder (Postovsky et al., Journal Prakt. Chem., 1929, (2), 122, 145) at temperatures from 130–140° C. to produce tetraphenylfuran in relatively low yield as the main reaction product, although the formation of tetraphenylfuran has not been explained.

In accordance with the present invention, on the other hand, tetraphenylfuran can be produced from benzoin in relatively high yields by simply heating the benzoin in the presence of a proton donating catalyst to a temperature of from 150–200° C.

The following examples will illustrate the manner in which the invention can be practiced. It is to be understood that the specific conditions set forth in the examples are not to be considered limiting of the invention which is defined only by the scope of the appended claims.

Example 1

Benzoin as a pure commercial product was recrystallized at least twice from ethanol before use. Thin layer chromatography (T.L.C.) showed the material to be pure and homogeneous. Desoxybenzoin was prepared according to the literature (Carter et al., Organic Synthesis, 1960 vol. 40, p. 16) and was purified by recrystallization from ethanol until T.L.C. showed the presence of only a very small amount of benzoin and no other impurity.

The benzoin in varying quantities (0.5–2.0 g.) alone or in the presence of various additives, was placed into ampules prepared from Pyrex tubing having an inner diameter of 1 cm. and a length of 10 cm. The ampules were twice evacuated and flushed with argon or nitrogen to remove all air and finally were evacuated and sealed in a vacuum of $10^{-3}$ mm. The sealed tubes were heated in a furnace to effect reaction for various periods of time at different temperatures.

After the predetermined reaction periods, the ampules were cooled, opened and the reaction mixture was treated with carbon tetrachloride, which dissolved all products except benzoin. The residual benzoin was collected and washed with carbon tetrachloride, dried and weighed. The combined crabon tetrachloride extract was evaporated to dryness, weighed, dissolved in 10 mm. of carbon tetrachloride and passed through a gas-liquid chromatography (G.L.C.) column (¼" copper tubing, 9′ in length) at 215° C. with 250 ml./min. of helium as a carrier gas. Benzil and desoxybenzoin gave quantitatively well reproducible results. Tetraphenylfuran was estimated from the difference between the total weight minus the weight of the mixture of benzil and desoxybenzoin; the tetraphenylfuran was also isolated and weighed after crystallization of the ternary mixture from ethanol, when benzil and desoxybenzoin remained in the mother liquor.

The results of Example 1 are tabulated for both semi-quantitative runs (Nos. 1–8) and for quantitative runs (Nos. 9–16) in Table I, which follows hereafter.

reasonably good material balance for the four main components in the reaction mixtures, namely benzoin, benzil, desoxybenzoin and tetraphenylfuran.

TABLE I

| Run | Benzoin, mg. | Additive | T., °C. | Hours Heat | Benzoin in Residue | Benzoin Converted to— | | | Analytical Methods and Remarks |
|---|---|---|---|---|---|---|---|---|---|
| | | | | | | Desoxy-benzoin | Benzil | Tetra-phenyl-furan | |
| 1 | 1,000 | None | 150 | 50 | Quant. | | | | T.L.C. |
| 1 | 250 | Talcum, 25 mg | 150 | 50 | Quant. | | | | T.L.C. |
| 3 | 2,000 | CaO, 50 mg | 150 | 50 | Much | Trace | Trace | Trace | T.L.C. |
| 4 | 2,000 | Et$_3$N, 0.1 ml | 150 | 50 | Much | Trace | Trace | Trace | T.L.C. |
| 5 | 2,000 | Conc. HCl, 0.1 ml | 150 | 50 | Trace | Much | Much | Much | T.L.C., G.L.C., I.R. |
| 6 | 2,000 | AlCl$_3$, 30 mg | 150 | 50 | Trace | Much | Much | Much | T.L.C., G.L.C., I.R. |
| 7 | 250 | Desoxybenzoin, 250 mg | 150 | 50 | Little | Little | Trace | Much | T.L.C., G.L.C. The Benzil/Desoxybenzoin ratio was about 1:100 |
| 8 | 250 | Desoxybenzoin 250 mg. +AlCl$_3$, 5 mg. | 150 | 50 | Trace | Little | Little | Much | T.L.C., G.L.C., The Benzil/Desoxybenzoin ratio was about 1:2.5 |
| | | | | | Percent | Percent | Percent | Percent | |
| 9 | 950 | Conc. HCl, 0.07 ml | 100 | 50 | 25 | 19.9 | 31.9 | 21.6 | |
| 10 | 950 | Conc. HCl, 0.07 ml | 100 | | None | 25.0 | 44.0 | 30.0 | |
| 11 | 950 | Conc. HCl, 0.07 ml | 150 | 1 | 38.8 | 15.4 | 27.6 | 19.0 | |
| 12 | 950 | Conc. HCl, 0.07 ml | 150 | 2 | 28.6 | 18.0 | 31.9 | 22.8 | |
| 13 | 950 | Conc. HCl, 0.07 ml | 150 | 4 | 18.8 | 19.1 | 24.8 | 24.8 | |
| 14 | 950 | Conc. HCl, 0.07 ml | 150 | 6 | 8.2 | 21.3 | 34.6 | 31.4 | |
| 15 | 250 | Conc. HCl, 0.07 ml | 150 | 50 | | 27.0 | 42.0 | 33.2 | |
| 16 | 950 | Conc. HCl, 0.07 ml | 185 | 50 | | 1.03 | 32.9 | 66.8 | |

Benzoin, benzil, desoxybenzoin and tetraphenylfuran were identified by melting point, mixed melting point, infrared (I.R.) spectra and T.L.C. Benzil and desoxybenzoin were quantitatively estimated by gas-liquid chromatography (G.L.C.). Tetraphenylfuran was completely retained in the G.L.C. column and its I.R. spectrum was typical.

The series of "semi-quantitative" runs of Example 1 show that at 150° C. practically no reaction takes place when benzoin is heated alone (Run 1), or in the presence of an inert powder (Run 2), or in the presence of base (Runs 3 and 4). In the presence of acidic catalysts, on the other hand, benzoin disappears almost completely from the reaction mixture (Runs 5 and 6) and is converted quantitatively to a mixture of benzil, desoxybenzoin and tetraphenylfuran.

The primary reaction for which the acid catalysts are necessary is the disproportionation of benzoin to benzil and desoxybenzoin. Benzil, once formed, does not react further and is stable, even in the presence of acid at 185° C. (Run 16). The second disproportionation product, desoxybenzoin, undergoes a facile cyclization reaction with benzoin to yield tetraphenylfuran. This cyclization can occur as a purely thermal reaction for which no catalyst is needed (Run 7) under which conditions essentially no disproportionation of benzoin takes place (this is shown by the estimated 1:100 ratio between benzil and desoxybenzoin in the residue). The uncatalyzed condensation to tetraphenylfuran is rather slow, however, and after 50 hours of heating at 150° C., a considerable amount of desoxybenzoin remained unconverted in Run 7.

In the presence of AlCl$_3$ (Run 8) and starting with the same mixture of benzoin and desoxybenzoin utilized in Run 7, both benzil and additional desoxybenzoin were formed by acid catalyzed disproportionation of the benzoin with the result that the benzoin was effectively completely reacted with desoxybenzoin. Here the acid catalysis influenced both the rate of disproportionation and the rate of the cyclization.

The quantitative Runs 10–16 utilizing benzoin in the presence of catalytic amounts of hydrochloric acid gave a The two main reactions in the system are:

$$2\text{PhCOCHOHPh} \xrightarrow{k_1} \text{PhCOCOPh} + \text{PhCOCH}_2\text{Ph} + \text{H}_2\text{O}$$
benzoin → benzil + desoxybenzoin

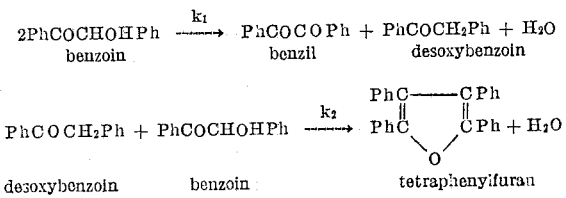

$$\text{PhCOCH}_2\text{Ph} + \text{PhCOCHOHPh} \xrightarrow{k_2} \text{tetraphenylfuran} + \text{H}_2\text{O}$$
desoxybenzoin + benzoin → tetraphenylfuran If the two reactions are considered consecutive, then depending on the ration $k_1:k_2$, two limiting cases may exist; (a) if $k_1$ is much greater than $k_2$, then the final reaction mixture should contain only the disproportionation products and hardly any tetraphenylfuran; (b) if $k_2$ is much greater than $k_1$, then practically every molecule of desoxybenzoin formed will react with a molecule of benzoin and starting with one mole of benzoin, the final mixture should contain about 0.33 mole of benzil and about 0.33 mole of tetraphenylfuran. The results in Table I show that at high temperatures (Run 16) case (b) is fulfilled, while at lower temperatures (Run 15) the ratio $k_2:k_1$ becomes smaller, as shown by the formation of more than ⅓ benzil together with a considerable amount of desoxybenzoin with the result that less tetraphenylfuran is formed. At 100° C. (Run 9) only about ⅔ of the benzoin reacted after 50 hours; extrapolation for temperatures less than 100° C. shows continuation of the same trend i.e., a further fall in the $k_2:k_1$ ratio at lower temperature.

Thus, it can be seen that at temperatures at or near 185° C. the reaction approximates the theoretical case (b); hence such operation constitutes the preferred procedure.

It will be obvious to those skilled in the art that various changes may be made without departing from the spirit of the invention and therefore the invention is not limited to what is described but only as indicated in the appended claims.

What is claimed is:
1. A method of forming tetraphenylfuran according to the reactions

(1)
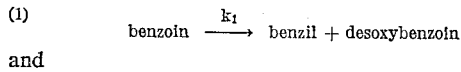
benzoin $\xrightarrow{k_1}$ benzil + desoxybenzoin and (2)
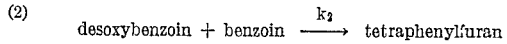
desoxybenzoin + benzoin $\xrightarrow{k_2}$ tetraphenylfuran comprising heating benzoin to a temperature within the range of 150–200° C. in the presence of aluminum chloride or hydrochloric acid as a catalyst to maintain $k_2$ at a value much greater than $k_1$.

2. A method in accordance with claim 1 comprising disproportionating at least a portion of said benzoin in the presence of acid catalyst to desoxybenzoin and reacting said desoxybenzoin with further benzoin in the presence of said catalyst to form said tetraphenylfuran.

3. A method in accordance with claim 1 wherein said temperature is approximately 185° C.

4. A method in accordance with claim 1, wherein said catalyst is HCl.

References Cited

Berger et al.: Journal of Organic Chemistry, vol. 24, p. 1881 (1959).

Postovsky et al.: Journal Prakt. Chem., 1929 (2), 122, 145.

NICHOLAS S. RIZZO, *Primary Examiner.*

UNITED STATES PATENT OFFICE
CERTIFICATE OF CORRECTION

Patent No. 3,359,284                                   December 19, 1967

Saul Patai et al.

It is hereby certified that error appears in the above numbered patent requiring correction and that the said Letters Patent should read as corrected below.

Column 1, line 17, for "member" read -- number --; columns 3 and 4, TABLE I, eighth column, line 14 thereof, for "24.8" read -- 34.8 --; column 4, lines 40 to 44, for that portion of the formula reading "$CPh+H_2O$" read -- $CPh+2H_2O$ --.

Signed and sealed this 18th day of February 1969.

(SEAL)
Attest:

Edward M. Fletcher, Jr.                                    EDWARD J. BRENNER

Attesting Officer                                              Commissioner of Patents